(12) United States Patent
Kobold et al.

(10) Patent No.: US 9,197,822 B1
(45) Date of Patent: Nov. 24, 2015

(54) ARRAY AUGMENTED PARALLAX IMAGE ENHANCEMENT SYSTEM AND METHOD

(71) Applicants: Michael C. Kobold, Panama City Beach, FL (US); Harold R. Suiter, Chipley, FL (US); Keith M. Aliberti, Panama City Beach, FL (US)

(72) Inventors: Michael C. Kobold, Panama City Beach, FL (US); Harold R. Suiter, Chipley, FL (US); Keith M. Aliberti, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/085,136

(22) Filed: Nov. 20, 2013

(51) Int. Cl.
*H04N 5/225* (2006.01)
*H04N 5/262* (2006.01)

(52) U.S. Cl.
CPC .................................. *H04N 5/2621* (2013.01)

(58) Field of Classification Search
CPC ............ H04N 5/23238; H04N 5/3415; H04N 3/1593; G06T 3/4038; G06T 2200/32; G03B 37/04
USPC ................................................. 348/218.1, 239
See application file for complete search history.

(56) References Cited

U.S. PATENT DOCUMENTS

| | | | | |
|---|---|---|---|---|
| 8,108,147 | B1 * | 1/2012 | Blackburn | 701/301 |
| 2011/0080487 | A1 * | 4/2011 | Venkataraman et al. | 348/218.1 |
| 2012/0147205 | A1 * | 6/2012 | Lelescu et al. | 348/218.1 |
| 2014/0286566 | A1 * | 9/2014 | Rhoads | 382/154 |

* cited by examiner

*Primary Examiner* — Kelly L Jerabek
(74) *Attorney, Agent, or Firm* — James T. Shepherd (57) ABSTRACT

An array augmented parallax image enhancement system and method is used for creating an artificially large depth of field behind images of detritus, or obscurants, to augment spatial in-filling of the obscured pixels in the desired target image. A plurality of relatively small aperture cameras produces a plurality of raw video streams. An obscurant identification module detects and maps the obscurants. A spatial averaging module replaces the obscurants with target image pixels in an output video stream that is produced by combining the plurality raw video streams.

18 Claims, 4 Drawing Sheets

ARRAY AUGMENTED PARALLAX IMAGE ENHANCEMENT SYSTEM AND METHOD

STATEMENT OF GOVERNMENT INTEREST

The invention described herein may be manufactured and used by or for the Government of the United States of America for governmental purposes without the payment of any royalties.

BACKGROUND OF THE INVENTION (1) Field of the Invention

The present invention relates generally to image enhancement systems and more specifically to an array augmented parallax image enhancement system and method wherein an array of cameras with different parallax are utilized to produce a plurality of raw video streams that are combined to reduce obscurants in an output video stream.

(2) Description of the Prior Art

Under certain situations, visibility is limited by various obscurants. For example, with underwater debris and driving during snow, use of active illumination can create a field of obscuring bright images (detritus or snowflakes) whose collective flow interferes with image processing. In other applications, such as back-lit scenarios, the near-field obscurants are normally darker than the far-field object images.

Optical systems for human and automated target recognition, also known as ATR, can waste processing time and resources on unimportant foreground object patterns. The critical maximum obscurant density depends on conditions and equipment.

Several prior inventions discussed below have been developed to reduce image obscuration due to background lighting changes and electronic noise in the television camera industry. These inventions utilize both spatial and temporal methods to filter and otherwise constrain unwanted effects from becoming part of the final image stream.

Using a simple large aperture for a close focus gives a tiny depth of field but useful blurring of near-field detritus spots, which then may be perceived as non-existent. However, this technique is sensitive to the focus of the aperture. The large aperture idea may also be too cumbersome for applications such as undersea autonomous vehicles. Importantly, the large aperture technique does not use automated features of image point selection found in industrial registration software such as in shader functions. A large aperture performs only a uniform average of imaged data related to the obscuration percentage and does not utilize operator or computed input for variability of weighting of imagery from different ranges that image registration functions can automatically provide. Other inventions discussed below use a single aperture or image formed from a single lens, without the use of modern-day image registration techniques used in industry such as the virtual image sphere.

U.S. Pat. No. 4,953,032 by Suzaki et al., August 1990, discloses a motion information signal generating circuit comprising a motion detecting circuit for detecting a piece of motion information from a digitized television signal, a temporal-spatial signal processing circuit for expanding a signal representing the detected motion information both in time and space and a noise eliminator circuit connected between the motion detecting circuit and the temporal-spatial signal processing circuit. The noise eliminator circuit has at least one memory to detect the correlation between the motion information signals pertaining to two adjacent picture elements which are one horizontal sweep line part, and for instance, the motion information signal of a smaller data quantity is selected, thereby preventing appearance of a false motion signal which would be caused by a noise of increased amplitude.

U.S. Pat. No. 5,303,051 by Lévesque et al., April 1994, discloses a method of video processing that consists or obtaining a number of images of a scene and replacing missing elements of the scene, which elements are ones obscured by particles, with corresponding elements of the scene obtained from previous or following images in which those particular elements of the scene are visible. In this manner, a reconstructed image of the scene can be obtained in which the effects of the particles on the image is reduced.

U.S. Pat. No. 5,075,778 by Saito et al., December 1991, discloses a television camera with automatic lens opening control that provides pictures from backlighted scenes which neither overly darken the subject nor overly brighten the background. The lens opening is controlled by the average value of the incident light intensity, but not before the incident light intensity is subjected to a white compression process. The signal corresponding to the incident light is processed by a white compression circuit to compress the brighter portions of the signal. The compressed output is averaged and used to control the lens opening.

U.S. Pat. No. 4,275,418 by Trump et al., June 1981, discloses a video noise reduction system for incoming video information from a plurality of picture points. A first processor is capable of synthesizing each picture point from incoming picture point information from adjacent picture points to provide noise reduced picture information. A store is provided for storing picture information from at least one frame and a second processor is capable of synthesizing each picture point from incoming and stored information from a corresponding picture point from current and earlier frames to effect noise reduction. A detector is provided to detect any movement between pictures to allow processing by the first processor when movement is occurring and from the second processor when no movement is occurring. A third processor may be provided to allow synthesizing from adjacent picture points from current and earlier pictures to effect noise reduction when the picture content is detected to be stationary and has only low frequency components therein.

U.S. Pat. No. 5,019,908 by Su et al., May 1991, discloses an apparatus and method for reducing flickering in a still video frame in a digital image processing system. In a digital image processing system, an A/D converter digitizes an input analog two-field (i.e. 525 lines NTSC) video signal into first and second digital video field data components of a digital video frame, and the data of the first and second fields is stored in an image memory. Under control command, the first digital video field data is read out of the image memory, switched to a data output and D/A converted into a first analog video field for supplying the first field component of an analog video still frame, and simultaneously the first digital video field data is also stored in a field memory. The second digital video field data is then read-out of the image memory into one input of an adder while the first digital video field data is read-out of the field memory into another input of the adder, whereby the first and second digital field data is digitally summed, then passed through a divider to provide the digital average of the data of the first and second digital video fields. The averaged digital video field data is then switched to the data output and D/A converted for supplying the second field component of a 2-field analog video still/freeze frame. Flicker due to relative motion occurring between the two field of the input analog video frame is reduced by one-half in the output analog video frame due to the digitally performed averaging operation, providing an improved still/freeze frame video picture.

U.S. Pat. No. 5,021,884 by Ozaki et al., June 1991, discloses a noise reducer circuit, for video signal. In a video signal noise reducer circuit, an output video signal is delayed in a frame memory, then subtracted from an input video signal, and the resultant difference signal then passed through a high pass filter. The difference signal and the filter output signal are then compared, and the signal currently having the smaller absolute amplitude is modified by an amplitude-dependent feedback factor and then subtracted from the input video signal to obtain the output video signal.

U.S. Pat. No. 4,654,583 by Ninomiya et al., March 1987, discloses a printed circuit pattern inspection system, in which the optical image of circuit patterns is transformed into an electrical signal, the signal is converted into a binary digital signal, the connectivity relationship between selected two points of a pattern in the form of a binary signal is examined, connection data representative of the connectivity relationship expressed by a pair of numbers given to the points is generated, and the connection data is compared with design data which is produced from design information and expressed in the form of a circulation list of numbers given to points in linkage relationship, whereby determination of defectiveness of patterns is made basing on the result of comparison.

U.S. Patent 4,829,382 by Hess et al., May 1989, discloses an automatic aperture control of a television camera. R, G and B outputs from the corresponding preamplifiers of a television camera are supplied to a non-additive mixer (NAM) circuit for continuous selection of the greatest of the three outputs and the selected output is continuously supplied to a set of nine electronic switches each selecting out a subdivision of the picture field (a, b . . . i). The switched outputs for each of the subfields are then provided to respective subfield measurement detectors which each produce an average value output and a peak value output. These are stored into subfield buffer units and then read out through a multiplexer and an analog to digital converter to a microprocessor. The various values are compared with corresponding past values for selecting between various measurement schemes for obtaining a camera diaphragm control signal, namely spot measurement, center-emphasized integral measurement and selective field measurement. Except when a decision for no setting change is made, the selected scheme of measurement is used to obtain a control signal from the average and dynamic range values of the several subfield video signals.

A need exists for an improved image enhancement system and method which can more effectively counteract image obscuration. Furthermore, a need exists for a system that takes advantage of industrial image registration capability that has been developed mostly within the past decade. Accordingly, those of skill in the art will appreciate the present invention which addresses the above discussed and other issues.

SUMMARY OF THE INVENTION

Accordingly, it is an object of the present invention to provide an improved control system and method for use of multiple video streams that are preferably registered to each other to replace obscurants with target images to provide a composite video stream with the obscurants removed.

Another object of the present invention is to provide a control system and method for detecting obscurants in different video streams.

Another object of the invention is to provide a module that provides for the replacement of the obscurant pixels with target image pixels and/or scenery image pixels.

Accordingly, in one embodiment an image enhancement method is provided to reduce obscurants in front of an image in an output video stream. The obscurants may comprise an obscurant size. The method may comprise non-limiting steps such as providing a plurality of spaced apart cameras spaced apart by a distance that can be greater than an aperture of each of the plurality of spaced apart cameras, and providing that the spacing distance between cameras is sufficient that the image is viewable by at least one camera of the plurality of cameras when the image is obscured for another of the plurality of cameras by an obscurant of the obscurant size to take advantage of the parallax differences.

Other steps may comprise providing that each of the plurality of cameras produce a raw video stream whereby the plurality of cameras produce a plurality of raw video streams taken at different; parallax positions or viewpoints, identifying obscurant pixels in the video streams, and combining the plurality of video streams into the output stream by replacing the obscurant pixels with image pixels of the desired image in the output stream.

The method steps may comprise comparing separate video streams with different parallax to determine whether the plurality of raw video streams are sufficiently different with respect to a target image to indicate a presence of the obscurants.

Other steps may comprise selecting between brighter elements that may be designated as near field obscurants for a front lighted view or darker elements that may be designated as near field obscurants for a back lighted view.

The method comprises producing a map of the obscurant pixels for video frames in each of the plurality of video streams and comparing the maps of the obscurant pixels from the video streams.

The method may comprise controlling replacement of the obscurant pixels with target image pixels that may comprise multiple intensity levels ranging from a plurality of darker pixel levels to a plurality of: lighter pixel levels. For example, there may be 32 or 64 or other numbers of pixel intensity levels.

The method may preferably comprise utilizing video frames for the plurality of video streams that occur at least approximately at the same time for the replacement of the obscurant pixels.

The method may also comprise utilizing synchronized video frames for comparing the plurality of video streams for the replacement of the obscurant pixels.

The method may utilize cameras for the plurality of cameras that comprise at least one of a remote sensing type camera, an electro-optic camera, an infrared camera, an ultraviolet camera, radar, or another image producing system or charged-coupled device type camera that provides a digital image stream.

The method may comprise separate programming for separate regions of the image stream. The separate regions of the image stream may be identified by at least one of a pixel number, a row and column, and/or percent or magnitude of height and width of a target image.

In another embodiment, an image enhancement system is provided that is operable to reduce obscurants, such as those in front of an image, in an output video stream produced utilizing a plurality of spaced apart cameras. A plurality of video processing modules may include modules such as an obscurant identification module configured to identify obscurant pixels in the plurality of video streams, and a spatial averaging module configured to combine the plurality of video streams into the output stream by replacing the obscurant pixels with image pixels of the image in the output stream with target image pixels. The modules may comprise software, hardware, and/or a combination of software and hardware.

The obscurant identification module comprises a module to compare separate streams and a module to determine whether the plurality of raw video streams is sufficiently different to indicate a presence of the obscurants.

The obscurant identification module may comprise an obscurant map module configured to produce a map of the obscurant pixels in each of the plurality of video streams. The spatial averaging module is operable to compare the map of the obscurant pixels in each of the plurality of video streams.

The spatial averaging module can comprise a controller that controls the replacement of the obscurant pixels with pixels that may comprise multiple intensity levels ranging from a plurality of darker pixel levels to a plurality of lighter pixel levels.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
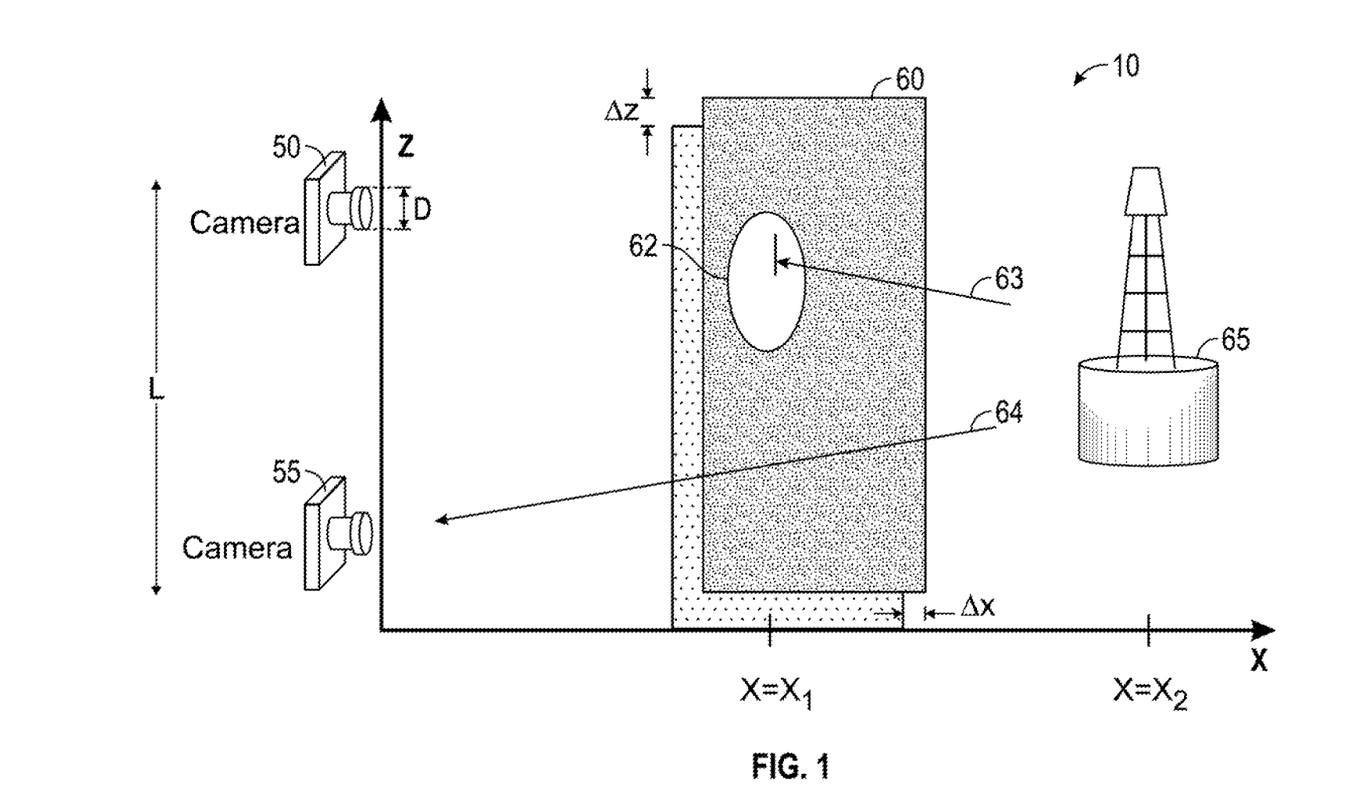
FIG. 1 is a side view diagram of a system with an array of cameras spaced apart to take advantage of different camera parallax during video processing in accord with one possible embodiment of the invention.
Figure 2:
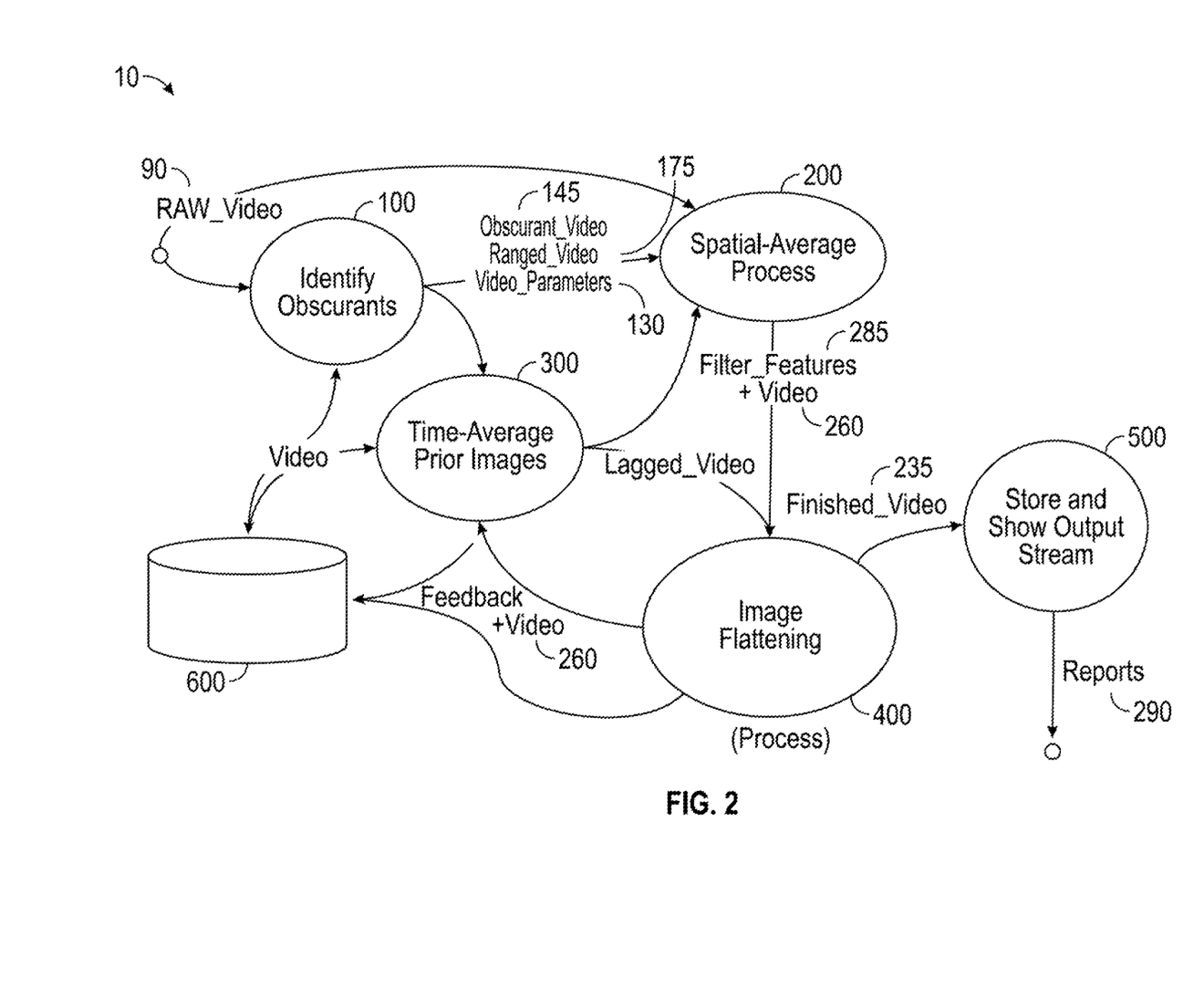
FIG. 2 is a diagram showing an overall augmented parallax image enhancement controller system and method in accord with one possible embodiment of the invention.

Referring now to the drawings and, more particularly, to FIG. 1 and FIG. 2, there is shown one possible physical embodiment of the array augmented parallel image enhancement (APIE) system 10 of the present invention that utilizes an array of cameras. System 10 utilizes an array of at least two cameras, e.g., camera 50 and camera 55. Note that the term "camera" may include various types of imaging systems as discussed in further detail below. In this case, obscurants such as obscurant 62, which may comprise snow, detritus, and the like, move within near-field region 60 between the array cameras 50, 55 and an object of interest such as target image 65. The obscurants 62 and/or near-field region of obscurants 60 may move as indicated by $\Delta x$ and $\Delta z$.

In FIG. 1, the view of target image 65 at distance $x_2$ from camera 50 is blocked as indicated by arrow 63 by obscurants such as obscurant 62 at distance $x_1$. However, camera 55 has a clear view as indicated by arrow 64, at least momentarily, of target image 65.

The image streams from both camera 50 and camera 55 will be processed as described hereinafter to remove detritus such as obscurant 62 from a registered or combined image stream from the multiple image streams of camera 50 and camera 55 to thereby allow enhanced imaging of target image 65.

In one example of an underwater video system in accord with the present invention, distance $x_1$ might comprise a distance of zero to one meter and distance $x_2$ might comprise a distance of two to fifteen meters. However, the invention is not limited to particular distances.

Cameras 50 and 55 can comprise relatively small aperture cameras in chat their camera opening or aperture D is much less than L, the distance between the cameras. As one possible non-limiting example herein, distance L could be equal to about ten times the camera aperture size D. It is noted that the distances and sizes of FIG. 1 are approximate distances shown for purposes of illustration of basic concepts.

The choice of more than one camera increases the bandwidth of the video system by N number of cameras. For the purpose of explanation, assume N=2, where the separation distance L is substantially larger than the aperture D of each camera, i.e., L>>Di, where i=1, ..., N. Using the minimum number of cameras required to provide a view around obscurant spot 62 (N=2), and using existing image registration software that aligns the pixels of images from both cameras, the benefit is that the array depth of field is unaffected by separation L. An analog system using a single large lens, L=D would be fast but would see the depth of field reduced as the aperture size D increases.

Camera 50 and camera 55 collect image streams and may store the image streams in buffers and a repository for use by array augmented parallax image enhancement (APIE) controller 10 as shown generally in FIG. 2 for further image processing.

The raw image streams (video) preferably each have an identification tag, which could be a header in a video frame (image), filename of the video, or combination of both. These tags contain information about each video stream which includes a time scamp, camera number, and data pertinent to the collection and processing of the video. As compared with the performance of a single large lens providing an analogue system as discussed above, consider the registered image stream from an array of cameras as discussed herein. By taking an efficiency reduction that limits response time to that available with the imaging power of the system computers, the depth of focus remains that of the original camera with a small aperture, which can be significantly larger than that of a large single lens.

Additionally, registration selection functions can be utilized to automatically replace obscurants within a programmable range of intensity in favor of those from a camera, such as camera 55, that fall in a different range. This programming can be region-dependent. For example, APIE controller 240, discussed hereinafter, allows for the specification of separate programming for separate regions of the image wherein the regions may be identified by pixel number, row and column, percent or magnitude of height and width of an image, or other pixel or image location specifications.

Referring now to FIG. 2, which provides an overview the APIE controller, APIE controller 10 is operable to utilize data from multiple raw video streams 90 stored utilizing an array of cameras, wherein at least two spaced apart cameras or sensors are utilized for the array as depicted in FIG. 1.

Raw video 90, which may contain obscurants, is processed to ultimately produce finished video 235, in which the obscurants are removed/reduced from the video. In this embodiment, raw video 90 passes through obscurant identification module 100 for identifying obscurants within the video. Raw video 90 may comprise information, such as a camera number from which each raw video stream 90 is derived, a time stamp, a vehicle from which raw video 90 is derived, an orientation of the camera that produces each raw video 90, and the like.

Spatial averaging module 200 produces an output stream for storing and/or displaying as indicated at 500. In one embodiment, prior images may be time averaged as indicated at 300 and/or go through image flattening module 400 before or after processing of spatial average module 200.

Figure 3:
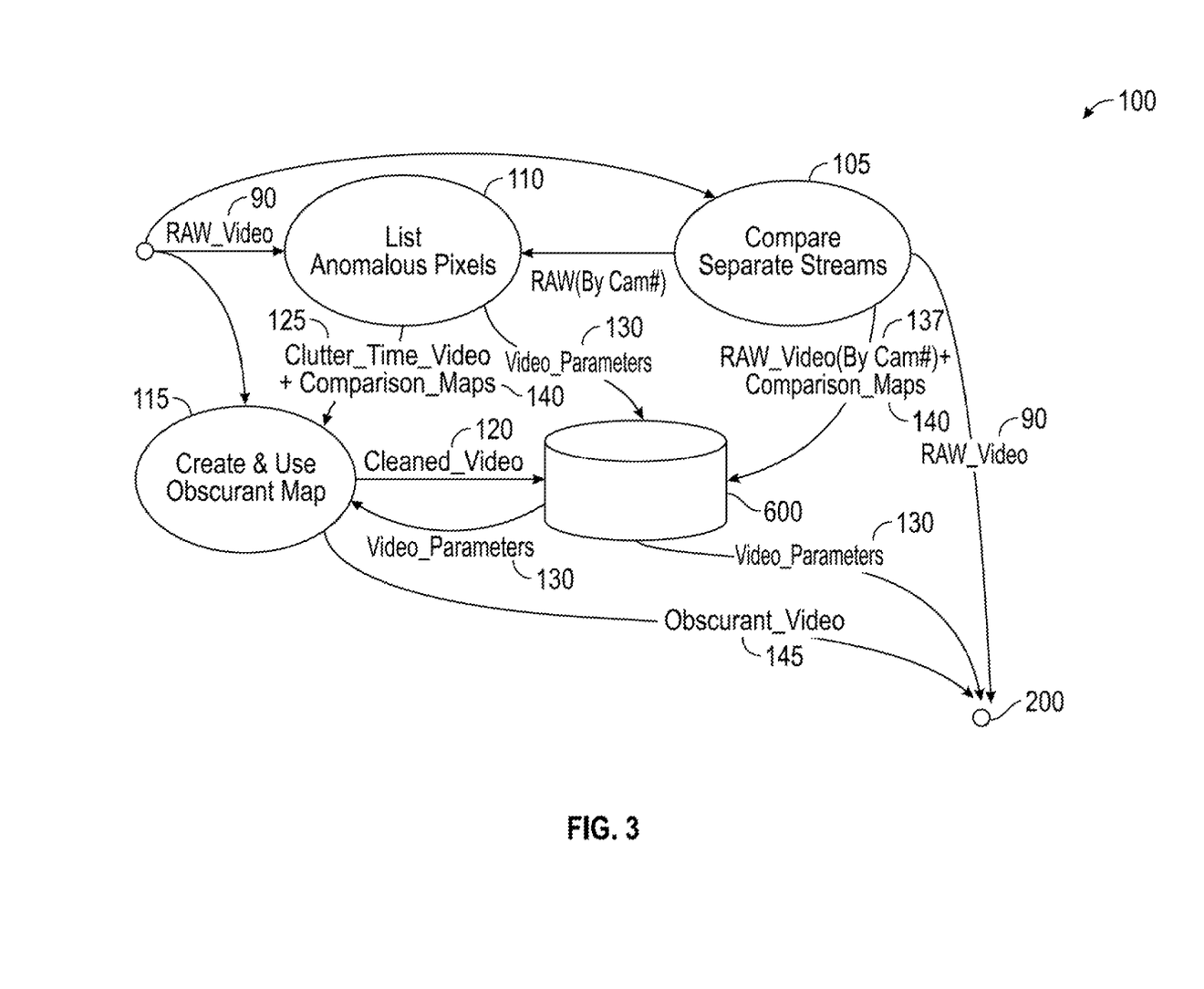
FIG. 3 is a diagram showing a more detailed view of a video processing module of the system of FIG. 2 for identifying obscurants in accord with one possible embodiment of the invention.

FIG. 3 discloses one possible system and method for identifying obscurants that describes in more detail obscurant identification module 100 shown in FIG. 2. In this example, module 105 compares separate video streams of the target image. Module 110 lists anomalous pixels and keeps track of which camera each video stream comes from. If sufficient differences in the video streams of the desired target image or scenery are found by module 105, then module 110 determines which video stream pixels are the obscurants and which video streams contain the desired background and/or target scenery.

Various techniques may be used for identifying obscurants. One example of a user selectable indicator that identifies obscurants is a brightness indicator. The indicator determines that the discrepancy is an obscurant if the discrepancy is bright for sensors using active illumination, or dark for back-lit images. For active illumination such as used in underwater sensing, the unwanted bright obscurants (detritus) will be brighter than the image of a desired object (obstructions to navigation, structures or mooring cables). For back lit scenes, the system allows selection of viewing beyond dark obscurants.

Another obscurant detector might comprise a large aperture detector focused at region $x_1$. Other obscurant detectors may be based on relative motion and/or machine learning techniques, some more particular examples of which are discussed hereinafter. However, the invention is not limited to a particular type of obscurant detector or technique.

Rather than replacing bright with dark (1 with 0) or vice versa, based on raster-type scan values of the signal in time, the present invention can replace a digital value of intensity ranging 1-N with the actual scene data from behind the undesirable foreground obscurants. N is typically 32, 64, 128, 256 or another higher value limited by processing capacity.

The effect of reducing image display of near-field obscurants by replacement with the image of far-field objects using a slightly different ray path can occur in a large aperture optic. However, in most expected applications a large aperture lens would be relatively heavy, bulky, and prone to aberrations requiring even larger optics, which can be difficult to package into unmanned vehicles. A large single lens configuration is not limited by bandwidth considerations, while the choice of more than one camera increases the bandwidth by N number of cameras.

Module 110 sends video parameters data 130 to processed frames module 600. Video parameters data 130 may comprise information such as which camera the image originated from, an area of obscurants, a density of obscurants, an intensity of pixels in the image stream, a depth to next obscurant, a density (dense, moderate, sparse) and the like. Module 110 also sends clutter time video data 125 comprising the amount of time or number of frames the clutter is detected and comparison maps data 140 to module 115 for creating an obscurant map for each frame of video.

Module 115 creates an obscurant map by grouping the obscurant pixels. Module 115 provides an additional acceptance or rejection capability by using the extra information of the state of neighboring pixels, which can be part of obscurants, targets or scenery. Using information within video parameters data 130, such as active lighting or back lighting, and identification of obscurant video 145 by the application of the obscurant maps, within comparison maps data 140, to raw video 90 or filtered video 260 to produce cleaned video data 120. This procedure can be accomplished with commercial shader functions or other algorithms, such as those used for video image registration in persistent surveillance systems. Cleaned video data 120 is then moved to processed frames module 600 while obscurant video data 145 containing a representation of the obscurants detected is sent to be used in spatial average module 200. Processed frames module 600 provides video parameters data 130 that can also be used in spatial average module 200.

Module 105 also provides raw video with camera number data 137 and comparison maps data 140 to processed frames module 600 for storage.

In an alternate embodiment of this invention, module 110 and module 115 can be merged or partially swapped. A first grouping of obscurants requires some information to determine anomalies. An iterative process such as boosting, for example Adaboost (short for adaptive boosting—a type of machine learning technique known in the art), or support vector machines can be used to detect obscurants as a part of the combined anomalous pixel—obscurant map process.

Obscurant video 145, ranged video 175, and video parameters 130, along with original image streams, or raw video 90, can pass through the spatial average module 200 before other processing, as depicted in FIG. 2 and FIG. 3.

Referring again to FIG. 2, spatial average module 200 performs the processing of the multiple image streams based on the image streams being from approximately the same time, preferably from synchronized video frames, but not necessarily.

Figure 4:
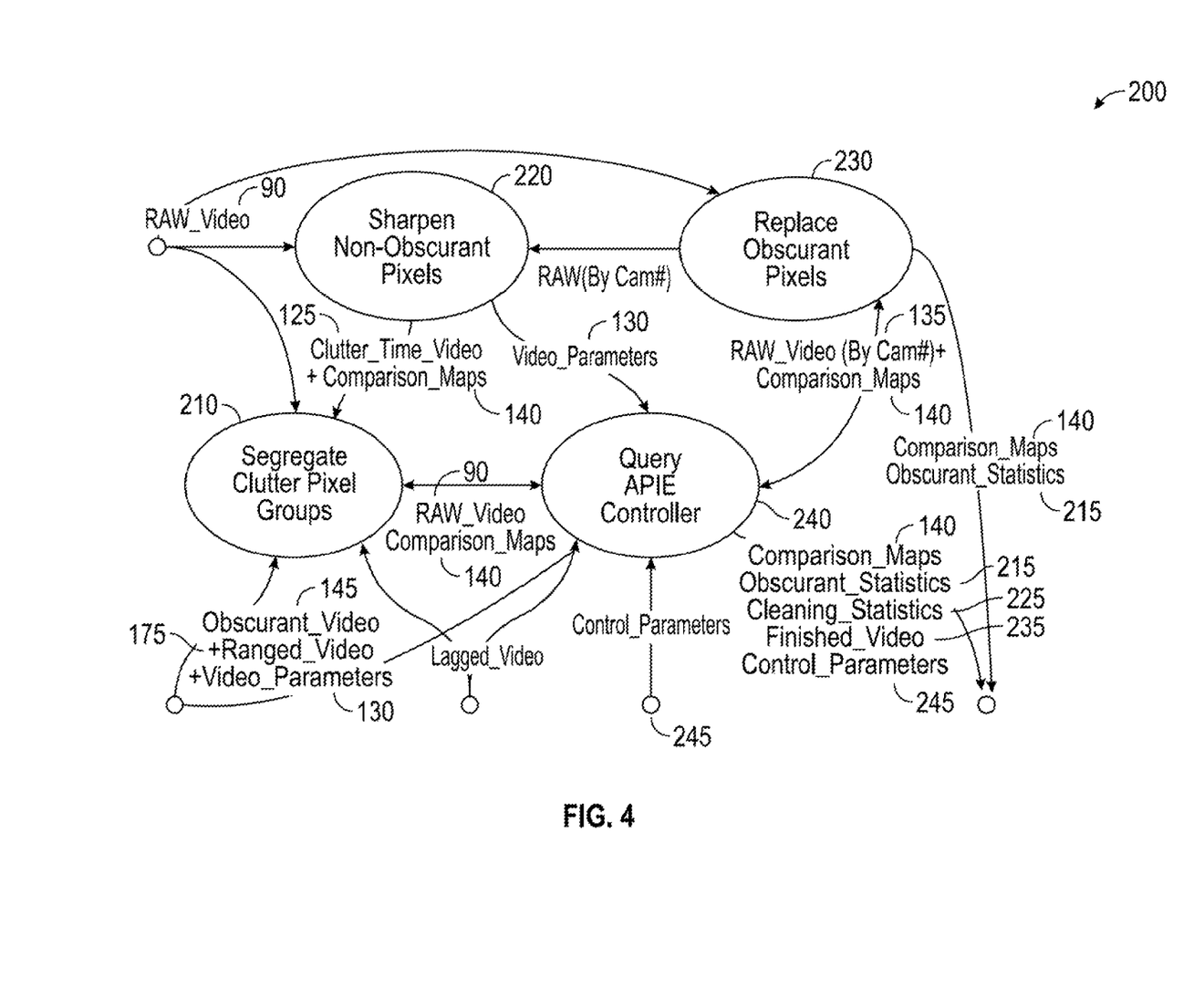
FIG. 4 is a diagram showing a more detailed view of a video processing module from FIG. 2 for replacement of obscurants in an output video stream in accord with one possible embodiment of the invention.

The details of spatial average module 200 are shown in FIG. 4. Module 210 segregates clutter pixel groups from obscurant video data 145, ranged video data 175 and video parameters data 130 into obscurant classes based on group size, such as the number of pixels or estimated object size, color and relative intensity compared to background scenery from pixels representing the same or similar, meaning close by, object regions of other streams, After the first pass to classify clutter, the modules or processes within the spatial average module 200 query APIE controller module 240 to determine how the spatial regions of each video frame patch together. Module 220 sharpens the non-obscurant pixels using dynamic range, flat-fielding, and other conventional or custom methods in combination with information about the obscurants to enhance the remaining image. A record is kept of the enhancement parameters in order to determine if the resulting linage regions from obscurant replacement will undergo the same processing. Module 230 replaces the obscurant pixels with the appropriately processed background and target imagery pixels gathered from data for the same pixel location from non-obscurant video streams as may be determined by registration of the plurality of raw videos. Accordingly, spatial average module 200 provides several values to be used in later processes. Module 230 produces comparison maps data 140 and obscurant statistics data 215, while APIE controller 240 produces comparison maps data 140, obscurant statistics data 215, cleaning statistics data 225, finished video data 235, and control parameters data 245. Control parameters data 245 may comprise information such as an obscurant size, an obscurant region, an obscurant shape and the like.

Accordingly, once the obscurants are identified with system 100, shown in more detail in FIG. 3, APIE controller 240 of FIG. 4 controls production of the finished video.

It will be understood that APIE controller 240 and/or other modules described herein can be primarily software but can also comprise hardware or a combination of hardware and software.

In one embodiment for actively illuminated underwater viewing in riverine or littoral conditions, the controller can substitute bright pixels with a weighted and enhanced combination of darker pixels from other video streams in order to image background scenery or target data without displaying the bright obscurant which is detritus in this case.

The invention could be used for cleaning video obtained when driving through snow with the headlights on where the snowflake image pixels have a brightness greater than a threshold above which background and target scenery does not rise. In both cases, controller 10 may use other filtering, weighting, and thresholds, including adaptive thresholds, in order to better remove obscurants to obtain the most accurate image of the background and target(s) possible. In this capacity, system 10 can act independently, autonomously, and/or with input from the operator.

Returning to FIG. 2, module 300 can be used to perform time-based processing utilizing different frames on the resulting imagery from spatial averaging module 200. System 10 may optionally choose to perform some of the time-based processing, such as range-gating and before spatial module 200.

Image flattening module 400 can be used to perform image enhancement processing on the resulting imagery from spatial average module 200. This imagery may include variable filter features data 285 and video 260. Some imagery enhancement techniques are publicly available and could be used in module 400. The controller may optionally choose to perform some of the image enhancement processing before action by spatial average module 200 depending on user preference. Finished video data 235 is then sent to store and show output stream module 500. Store and show output stream module 500 optionally displays and/or provides reports data 290, which comprises the output enhanced and obscurant-replaced image stream to the operator and stores the streams for future use.

To summarize and further clarify, APIE system 10 comprises an array of cameras (at least N=2) in order that one of the cameras would have imagery from far-field objects behind near-field obscurants that occasionally enter the field of view of the other cameras. Thus the first camera sees near-field objects that block desired scenery beyond in the far-field which the second camera can see at the same time, and vice versa. Mere cameras can decrease overall obscuration but the return or processing efficiency on image enhancement may diminish quickly after N=2.

The distance between sensors, including cameras, can be adjusted either manually or preferably automatically to respond to user needs and the environment. A non-APIE example is that in sonar or medical ultrasound the coherence of the sensors creates a 'beam pattern' or polar receiver pattern that changes along the azimuth so that when the sine of the azimuth angle is at the wavelength divided by twice the distance between the sensors, no signal can be sensed; we are at the first null. The sensor can be steered away from this null by changing directly by the distance L between sensors or the wavelength. Dealing with sensor nulls and other characteristics will then affect APIE performance because the parallax at greater L provides for more complete obscurant removal. While smaller L provides less image registration distortion, the obscurant removal will often be the more important feature. Having an actuated controlled array separation distance L provides for improved performance by allowing the system to respond to operational and environmental changes.

These cameras and/or imaging systems can be of an ordinary remote sensing type, electro-optic, infrared (IR), microbolometer, ultraviolet, ultrasonic, radar, sound tomography, medical tomography, and/or other image producing systems and/or charged-coupled device type camera, CMOS cameras, including medical tomography systems, and/or other systems that provide a digital image and/or image related streams, and/or combinations of the above cameras and/or systems, and/or other cameras and/or systems that produce digital image streams. Accordingly, as used herein, the term "camera," e.g., camera 50 and camera 55, includes any of the above. The type of sensor technology such as but not limited to an IR micro-bolometer and/or cooled IR, and/or a multi-spectral chip perhaps using photon penetration concepts, is not crucial to this invention. As long as a digital image is available, in some case sufficiently faster than real-time for the image registration to complete with adequate latency for the desired application, most any camera, radar, sonar, or other system that provides digital image streams will suffice as an input sensor for APIE.

Multi-scale algorithms (not shown in FIG. 2) will help register cameras of sufficiently different grid patterns, sensor pitch, and pixel alignments. This is an auxiliary function within the main system, a camera or imaging system driver controlled by APIE controller 240.

A 'color' form of the APIE system allows for several different frequencies to be processed separately as in a conventional color, multi-spectral, or hyper-spectral system, all using two or more separate frequency channels.

A multi-disciplinary form of array augmented parallax image enhancement, not depicted in FIG. 2, merges video streams from different types of sensors. This system is similar to that described hereinbefore regarding multi-scale algorithms, except that it couples video from, for example, acoustic and optical systems where obscurant size may require scaling for sensor physics differences, where the return from the same obscurant is markedly different in size and intensity compared to the background. This is an auxiliary function within the main system, a camera or imaging system driver controlled by APIE controller 240.

The cameras are separate imaging systems so that they can be placed at convenient, locations with separation distances that will allow parallax changes that include imagery obscured by another camera in the array.

The common configuration uses cameras synchronized in time. But the APIE system can use imagery from subsequent passes in a post-processing mode or with image estimates and parameters available to form a cumulative processing mode during each pass.

The near-field obscurant need only be outside the parallax of a separate camera in order for the image registration systems to be able to remove it pixel by pixel from the resulting image stream. As the environment worsens approaching critical obscurant density, the system provides less than full obscurant removal. Partial removal is still an improvement but the percentage of removal decreases as the critical obscurant density arrives. At that point, the system displays raw video data 90 or partially processed video data 260, optionally conventionally filtered, in order to allow for increased frame rate or to provide inter-frame processing time margin. This margin allows the system enough processing time to detect state changes, such as when the state appears to allow for re-establishment of full APIE processing, or for testing and comparing non-APIE filtering methods. The latter is a run-time diagnostic feature.

Image registration functions including custom function and those obtained from or derived from conventional commercial image registration systems are used to focus the image streams from the array of cameras on a virtual image surface, which can be curved. This is one of the intermediate steps in commercial image registration. The APIE system cameras are configured to integrate with this process.

The registration functions are programmable such that they can optionally replace bright or dark pixels within user or system prescribed activation ranges using substitution pixel magnitudes from other cameras within prescribed substitution magnitude ranges. The simplest form will replace bright scatter, similar to bright vehicle headlights in a snow storm, with the darker (far-field) object and background scenery imagery for that approximate location seen by another camera or set of camera(s). In this case, the obscurants comprise the brightest pixels in the image.

APIE system 10 image registration can comprise commercial software, shader functions and sub-functions. Initially, system 10 may only execute a preliminary solitary registration system. APIE system 10 can be programmed to select other cases besides bright near-field obscurants and to accept user override and processing direction. APIE system 10 will preferably accept automated and override control and can feed back parametric data for use in selection of commercial registration parameters (i.e. the shape and location of a virtual spherical image), which may be used as input data for systems.

APIE system 10 allows for the specification of separate programming for separate regions of the image identified by pixel number, row and column, percent or magnitude of height and width, or other pixel or image location specification.

The registration functions can have image weight parameters for the separate cameras (or any image stream), frequency channels, specified regions, and brightness ranges so that an array of more than two cameras can use a weighted average of magnitudes from non-obscurant pixels that register as being from the equivalent location in the image.

The APIE system can allow for selection of competing and complementary image registration systems in order to compare image enhancement metrics such as percent obscurant removed and stability of obscurant reduction over time in order to limit errors such as pixel replacement jitter. Running different commercial software in parallel will allow for such comparison. The system can provide storage of processing from different software loads in a manner that will allow for configuration management of processing methods and the resulting data.

The system can have a feature that allows suspension of APIE processing in order to see an average image stream over all cameras or image streams from each camera separately, tiled, or together in a form programmable by the user or administrator. This and other viewport system features are useful to allow for comparisons and diagnostics. This feature can comprise a physical or software button for activation or one of these modes mostly used for diagnostics.

The APIE algorithms include interfaces for user-selectability of time-averaging, time-gating, and other spatial averaging and filtering as described in the background section. The interface capability also applies to the ability to allow forms of spatial, time-based, and time-gated and range-gated and other signal processing.

The APIE system can be used with automatic target recognition (ATR) systems to provide a notification of objects in a vehicle path as well as object detection, recognition and identification. ATR output can be used as another input for APIE system 10 to change image regions or weight expected ranges and intensities differently based on detected, recognized and identified objects.

APIE system 10 can allow for additional storage of the rejected pixels, providing an obscurant map that can provide statistics for detritus flow in underwater viewing. These potentially binary image streams provide statistical information which can be synchronized to the APIE processed result in order to mark the image stream output with obscurant density, obscurant flow rate, and other statistical and dynamic parameter data. Such stream marking is useful for diagnostics, image stream interpretation, and real-time processing parametric improvement of final image streams. These improvements in image quality can be accomplished by changing parameters in the image registration functions, shader functions, the image registration software controllers, or by straight-forward signal processing such as notch filtering a known source of noise.

APIE system 10 includes the flexibility to have "color" obscurant maps, where the information is more than just whether the obscurant is in a particular pixel or not. This feature would be beneficial in situations where cameras and/or sensors of differing types are being used, as discussed hereinbefore. The "color" obscurant par can include identification information related to obscurants from different physics, i.e. acoustic versus infrared, or sensor pixel geometries, i.e., pixel related pitch on the sensor. A binary map would be only for conforming imaging systems.

While some on-board image stream data is stored, the APIE system will be able to broadcast or otherwise communicate with, a station that receives the resulting image stream and parametric data.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. An image enhancement method to reduce obscurants in front of an image of an object that obscures the image in an output video stream, the obscurants comprising an obscurant size, said method comprising:
   providing a plurality of spaced apart cameras spaced apart by a distance that is greater than an aperture of each of said plurality of spaced apart cameras;
   providing that said distance is sufficient that said image of said object is viewable by at least one camera of said plurality of cameras when said image of said object is obscured for another one of said plurality of cameras by an obscurant comprising the obscurant size;

providing that each of said plurality of cameras produce a raw video stream whereby said plurality of cameras produce a plurality of raw video streams;

utilizing user input to select between designating brighter elements as obscurants for a front lighted view or designating darker elements as obscurants for a back lighted view;

identifying obscurant pixels in said plurality of raw video streams; and combining said plurality of raw video streams into said output stream by replacing said obscurant pixels with image pixels of said image of said object in said output stream.

2. The method of claim 1, further comprising comparing said plurality of raw video streams to determine whether said plurality of raw video streams are sufficiently different with respect to said image of said object to indicate a presence of said obscurants.

3. The method of claim 1, further comprising producing a map of said obscurant pixels in frames of video for each of said plurality of raw video streams.

4. The method of claim 3, further comprising comparing said map of said obscurant pixels in each of said plurality of raw video streams.

5. The method of claim 4, further comprising controlling replacement of said obscurant pixels with said image pixels of said image of said object by providing that said image pixels comprise multiple intensity levels ranging from a plurality of darker pixel levels to a plurality of lighter pixel levels.

6. The method of claim 5, further comprising utilizing video frames from said plurality of raw video streams that occur at least approximately at the same time for said replacement of said obscurant pixels.

7. The method of claim 5, further comprising utilizing synchronized video frames from said plurality of raw video streams for said replacement of said obscurant pixels.

8. The method of claim 1, wherein said plurality of cameras comprise at least one of a remote sensing type camera, an electro-optic camera, an infrared camera, an ultraviolet camera, a radar system, a sound tomography device, a medical tomography device, and a charged-coupled device that provides a digital image stream.

9. The method of claim 1, further comprising providing an option for different processing for replacing said obscurant pixels in separate regions of said image stream wherein said separate regions are identified by at least one of a pixel number, a row and column, percent, or magnitude of height and width of said image of said object.

10. The method of claim 1, further comprising selectively adjusting said distance between said plurality of cameras.

11. An image enhancement system operable to reduce obscurants in front of an object that obscure an image of the object in an output video stream, the obscurants comprising an obscurant size, said image enhancement system comprising:

a plurality of spaced apart cameras spaced apart by a distance that is greater than an aperture of each of said plurality of spaced apart cameras, said spacing being sufficient that the image of the object is viewable by at least one camera of said plurality of cameras when the image of the object is obscured for another one of said plurality of cameras by an obscurant comprising the obscurant size, each of said plurality of cameras being configured to produce a raw video stream whereby said plurality of cameras produce a plurality of raw video streams; and a plurality of video processing modules configured to identify obscurant pixels in said plurality of raw video streams and to combine said plurality of raw video streams into an output stream by replacing said obscurant pixels with image pixels of the image in the output stream, wherein said plurality of video processing modules are operable to utilize user input to select between detecting brighter elements as obscurants for a front lighted view or darker elements as obscurants for a back lighted view.

12. The system of claim 11, wherein said plurality of video processing modules are configured to determine whether said plurality of raw video streams are sufficiently different to indicate a presence of the obscurants.

13. The system of claim 11, wherein said plurality of video processing modules are configured to produce a map of said obscurant pixels for frames of video in each of said plurality of raw video streams.

14. The system of claim 13, wherein said plurality of video processing modules are configured to compare said map of said obscurant pixels in each of said plurality of raw video streams.

15. The system of claim 14, wherein said plurality of video processing modules are configured to utilize video frames from said plurality of raw video streams that occur at least approximately at the same time for said replacement of said obscurant pixels.

16. The system of claim 11, wherein said plurality of video processing modules are configured to allow for separate programming of separate regions of said image stream wherein said separate regions are identified by at least one of a pixel number, a row and column, percent or magnitude of height and width.

17. The system of claim 11, wherein said plurality of modules are operable to register said plurality of raw video streams.

18. The system of claim 11, wherein said distance between said plurality of cameras is adjustable.

* * * * *